(12) United States Patent
Everhart et al.

(10) Patent No.: US 9,096,188 B2
(45) Date of Patent: Aug. 4, 2015

(54) MOUNTING SENSOR AND AFTERMARKET DEVICE EQUIPPED WITH MOUNTING SENSOR

(71) Applicant: General Motors LLC, Detroit, MI (US)

(72) Inventors: Charles A. Everhart, Canton, MI (US); Mark S. Frye, Grosse Pointe Woods, MI (US); Steven Swanson, Commerce Township, MI (US); Lawrence D. Cepuran, Northville, MI (US); Matt C. Videtich, Farmington Hills, MI (US); Steven S. Sauerbrey, Farmington Hills, MI (US); Wahaj Ahmed, Dearborn, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 181 days.

(21) Appl. No.: 13/849,283

(22) Filed: Mar. 22, 2013

(65) Prior Publication Data

US 2014/0288770 A1   Sep. 25, 2014

(51) Int. Cl.
*G06F 11/30* (2006.01)
*G06F 7/00* (2006.01)
*B60R 25/00* (2013.01)
*B60W 10/00* (2006.01)
*B60R 21/01* (2006.01)

(52) U.S. Cl.
CPC .............. *B60R 25/00* (2013.01); *B60W 10/00* (2013.01); *B60R 2021/01006* (2013.01)

(58) Field of Classification Search
None
See application file for complete search history.

(56) References Cited

U.S. PATENT DOCUMENTS

| | | | |
|---|---|---|---|
| 5,613,564 A | 3/1997 | Rhines | |
| 5,950,973 A * | 9/1999 | Verma | 248/222.51 |
| 6,082,764 A | 7/2000 | Seki et al. | |
| 6,670,888 B2 * | 12/2003 | Schmidt et al. | 340/687 |
| 6,864,786 B2 * | 3/2005 | Speckhart et al. | 340/467 |
| 7,741,961 B1 * | 6/2010 | Rafii et al. | 340/435 |
| 8,214,148 B2 * | 7/2012 | Anderson | 701/500 |
| 8,825,274 B2 * | 9/2014 | De Tommasi | 701/31.1 |
| 2003/0016124 A1 * | 1/2003 | Schmidt et al. | 340/425.5 |
| 2004/0160315 A1 * | 8/2004 | Speckhart et al. | 340/467 |
| 2004/0172173 A1 * | 9/2004 | Goto et al. | 701/1 |
| 2005/0273211 A1 | 12/2005 | McGarry et al. | |
| 2006/0250229 A1 * | 11/2006 | Cheng et al. | 340/468 |

(Continued)

OTHER PUBLICATIONS

USPTO, Office Action for U.S. Appl. No. 13/849,264, mailed May 20, 2014.

(Continued)

*Primary Examiner* — Mussa A Shaawat
(74) *Attorney, Agent, or Firm* — Ingrassia Fisher & Lorenz, P.C.

(57) ABSTRACT

An aftermarket device is disclosed herein. In an embodiment, the aftermarket device includes, but is not limited to, a housing that is configured to be mounted to an internal surface of a vehicle. The aftermarket device further includes, but is not limited to a processor that is mounted within the housing. The aftermarket device still further includes, but is not limited to, a mounting sensor that is associated with the housing and that is communicatively coupled with the processor. The mounting sensor is configured to detect a mounting status of the housing and to provide a signal to the processor. The signal contains information indicative of the mounting status of the housing. The processor is configured to determine that the housing is improperly mounted to the internal surface of the vehicle based on the mounting status.

16 Claims, 3 Drawing Sheets

(56) References Cited

U.S. PATENT DOCUMENTS

| | | | |
|---|---|---|---|
| 2008/0119962 A1* | 5/2008 | Voeller et al. | 700/279 |
| 2010/0125404 A1* | 5/2010 | Anderson | 701/200 |
| 2010/0295665 A1* | 11/2010 | Landau et al. | 340/10.42 |
| 2011/0006943 A1* | 1/2011 | Shaffer | 342/146 |
| 2011/0291823 A1 | 12/2011 | Christensen et al. | |
| 2012/0223833 A1 | 9/2012 | Thomas et al. | |
| 2012/0330497 A1* | 12/2012 | De Tommasi | 701/33.1 |
| 2013/0084847 A1* | 4/2013 | Tibbitts et al. | 455/419 |
| 2013/0115933 A1* | 5/2013 | Owens et al. | 455/418 |
| 2014/0113619 A1* | 4/2014 | Tibbitts et al. | 455/419 |
| 2014/0253737 A1* | 9/2014 | Kempinski | 348/169 |

OTHER PUBLICATIONS

USPTO, Response to Office Action for U.S. Appl. No. 13/849,264, mailed Aug. 20, 2014.

USPTO, Notice of Allowance and Fee(s) Due for U.S. Appl. No. 13/849,264, mailed Sep. 22, 2014.

\* cited by examiner

MOUNTING SENSOR AND AFTERMARKET DEVICE EQUIPPED WITH MOUNTING SENSOR

TECHNICAL FIELD

The technical field generally relates to vehicles, and more particularly relates to a mounting sensor and an aftermarket device equipped with a mounting sensor.

BACKGROUND

Aftermarket devices for use with a vehicle are available in the market place. Such aftermarket devices include, but are not limited to, aftermarket telematics units. Some aftermarket devices are configured to be mounted to an internal surface inside of the vehicle. Such surfaces may include, but are not limited to, a windshield, an A-pillar, a dashboard, a center console fascia, and the like.

Some aftermarket devices need to be mounted securely to the internal surface and/or at a predetermined orientation within the vehicle in order to function properly. If such an aftermarket device comes loose or falls from its mounting location or is partially dislodged from the internal surface, some or all of the functions performed by the aftermarket device may be adversely impacted.

Accordingly, it is desirable to detect when the aftermarket device is improperly coupled to the internal surface of the vehicle. In addition, it is desirable to detect when the aftermarket device has become dislodged from its proper mounting position with respect to the internal surface. Furthermore, other desirable features and characteristics of the present invention will become apparent from the subsequent detailed description and the appended claims, taken in conjunction with the accompanying drawings and the foregoing technical field and background.

SUMMARY

Various non-limiting examples of a mounting sensor and an aftermarket device equipped with a mounting sensor are disclosed herein.

In a first non-limiting example, the mounting sensor includes, but is not limited to, a housing that is configured for coupling to an aftermarket device. The mounting sensor further includes, but is not limited to, a member that is coupled to the housing and that is configured to move between a first position and a second position. The mounting sensor is configured to generate a signal containing information indicative of the position of the member, and to provide the signal to a processor associated with the aftermarket device.

In another non-limiting example, the aftermarket device includes, but is not limited to, a housing that is configured to be mounted to an internal surface of a vehicle. The aftermarket device further includes, but is not limited to, a processor that is mounted within the housing. The aftermarket device still further includes, but is not limited to, a mounting sensor that is associated with the housing and that is communicatively coupled with the processor. The mounting sensor is configured to detect a mounting status of the housing and to provide a signal to the processor. The signal contains information that is indicative of the mounting status of the housing. The processor is configured to determine that the housing is improperly mounted to the internal surface of the vehicle based on the mounting status.

In yet another non-limiting example, the aftermarket device includes, but is not limited to, a housing that is configured to be mounted to an internal surface of a vehicle. The aftermarket device further includes a processor that is mounted within the housing. The aftermarket device further includes a mounting sensor that is associated with the housing and that is communicatively coupled with the processor. The mounting sensor is configured to detect a mounting status of the housing and to provide a signal to the processor. The signal contains information that is indicative of the mounting status of the housing. The aftermarket device still further includes a collision sensor that is communicatively coupled with the processor. The collision sensor is configured to detect when the vehicle has experienced a collision and to provide a second signal to the processor. The second signal contains information indicative of an occurrence of the collision. The processor is configured to determine that the housing is improperly mounted to the internal surface of the vehicle based on the mounting status.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

A mounting sensor and an aftermarket device equipped with a mounting sensor are disclosed herein. In a non-limiting example, the mounting sensor is configured to be mounted to the aftermarket device and, in some examples, may be integrated into the aftermarket device. In some examples, the mounting sensor includes a member that protrudes from a housing of the mounting sensor. When the aftermarket device is mounted to a surface of a vehicle, such as a windshield or an A-pillar, the member will be depressed by the surface and will retract to a retracted position within the housing of the mounting sensor. If the aftermarket device is incorrectly installed onto the surface of the vehicle, or if after it has been properly installed, it becomes partially or completely dislodged from the surface of the vehicle, the member will move out of the retracted position. When the member moves out of the retracted position, the mounting sensor will send a signal to the aftermarket device that is indicative of the member having moved out of the refracted position.

In other examples, the mounting sensor may be configured to operate using magnets. For example, a magnet may be mounted to the surface of the vehicle. When the mounting sensor is sufficiently close to the magnet, a switch may be closed that may result in the transmission of a signal to the processor. When the mounting sensor moves away from the magnet, the switch may open and the mounting sensor may cease transmission of the signal.

The aftermarket device is configured interpret the presence or absence of the signal as being indicative of the aftermarket device having become dislodged from the surface of the vehicle. In some examples, the aftermarket device may alert the vehicle operator/occupant via an audible or visible signal, while in other examples, the aftermarket device will transmit a signal to an external third party that, in turn, will contact the vehicle operator/owner to alert him or her as to the mounting condition of the aftermarket device.

A greater understanding of the teachings discussed above may be obtained through a review of the illustrations accompanying this application together with a review of the detailed description that follows.

Figure 1:
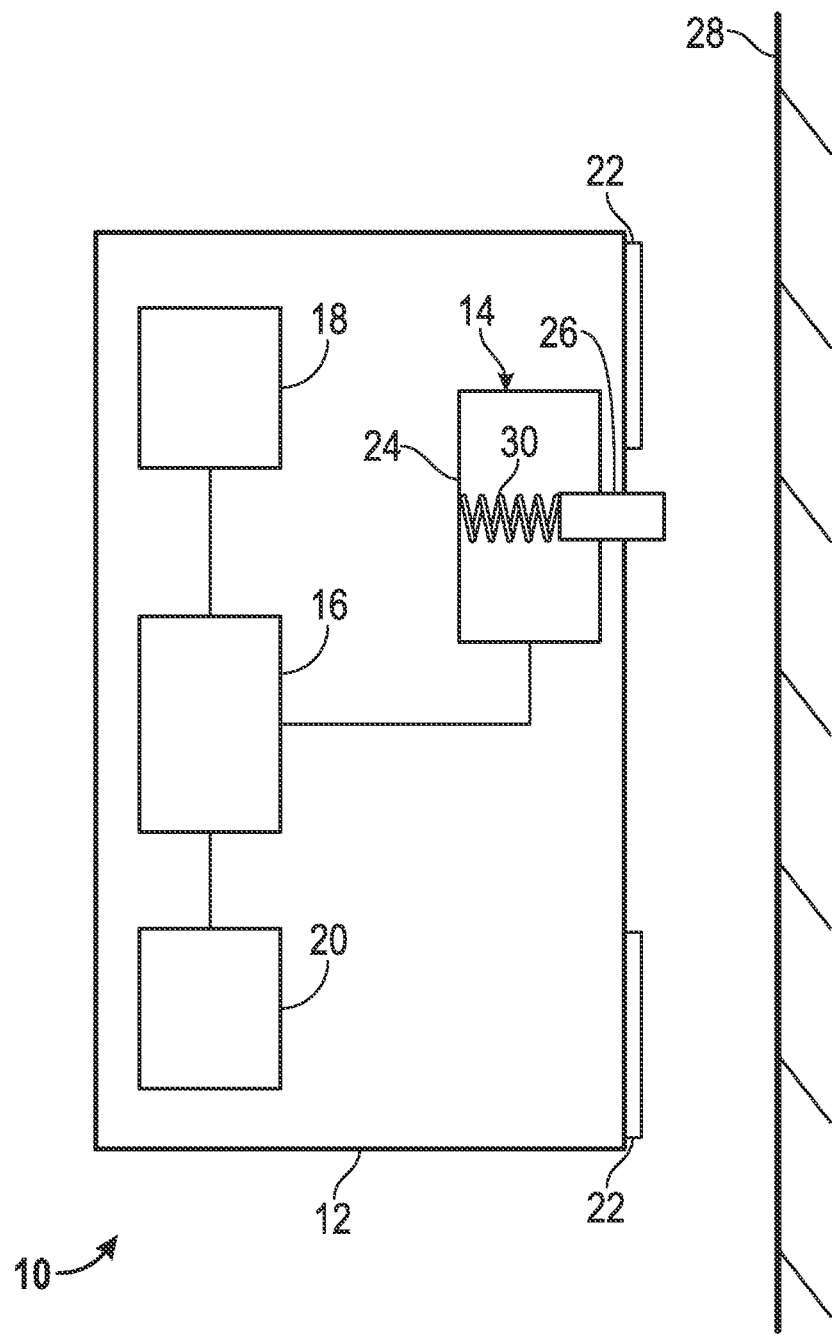
FIG. 1 is a schematic view illustrating a non-limiting example of an aftermarket device equipped with a mounting sensor, wherein both the aftermarket device and the mounting sensor have been made in accordance with the teachings disclosed herein.

FIG. 1 is a schematic view illustrating a non-limiting example of an aftermarket device 10 made in accordance with the teachings of the present disclosure. In some examples, aftermarket device 10 may comprise an aftermarket telematics unit. Known aftermarket telematics units are disclosed in U.S. Publication No. 2011/0291823 published on Dec. 1, 2011, and also in U.S. Publication No. 2005/0273211 published on Dec. 8, 2005, each of which is hereby incorporated herein by reference. In other embodiments, aftermarket device 10 may comprise any other device that is suitable for use in a vehicle and that is configured for mounting to an internal surface of the vehicle.

Aftermarket device 10 includes a housing 12, a mounting sensor 14, a processor 16, a communication component 18, a collision sensor 20, and a double-sided adhesive 22. In other examples, aftermarket device 10 may include a greater or lesser number of components without departing from the teachings of the present disclosure. In the illustrated example, mounting sensor 14 and collision sensor 20 are communicatively coupled with processor 16 while communication component 18 is operatively coupled with processor 16.

In the illustrated example, mounting sensor 14 is integrated within housing 12 and is packaged together with aftermarket device 10. In other embodiments, mounting sensor 14 may be a separate component that is packaged or sold separately from aftermarket device 10 and that may be mounted to an external surface of housing 12. Mounting sensor 14 includes a housing 24. Housing 24 may be configured for attachment to housing 12 such as through the use of adhesives or other fasteners. Mounting sensor 14 further includes a member 26 that is configured to move between an extended position (depicted in FIG. 1) and a retracted position (depicted in FIG. 2). Housing 12 and housing 24 each include an opening through which member 26 protrudes to contact an internal surface 28 of a vehicle. Mounting sensor 14 further includes a spring 30 coupled with member 26 and configured to urge member 26 towards the extended position.

Mounting sensor 14 is configured to generate a signal indicative of the position of member 26. In some examples, mounting sensor 14 may further include a microprocessor that is configured to detect the position of member 26. In other examples, mounting sensor 14 may comprise a switch that is configured to close a circuit or otherwise send a signal based upon the position of member 26. In some examples, mounting sensor 14 may be configured to generate the signal when member 26 is in the retracted position. In other examples, mounting sensor 14 may be configured to generate the signal when member 26 is in any position other than the retracted position. In still other examples, mounting sensor 14 may be configured to generate the signal when member 26 is in the extended position.

Processor 16 may be any type of computer, controller, micro-controller, computer system, or microprocessor that is configured to perform algorithms, to execute software applications, to execute sub-routines and/or to be loaded with and to execute any other type of computer program. Processor 16 may be coupled to mounting sensor 14, communication component 18, and collision sensor 20 in any suitable manner including through the use of wires, leads, coaxial cables and/or any other wired connection suitable for conveying a signal. In other non-limiting embodiments, processor 16 may be wirelessly connected to mounting sensor 14, communication component 18, and collision sensor 20 via any suitable wireless connection, including through the use of radio frequency transmissions, Bluetooth connectivity, infrared transmissions, and the like.

Communication component 18 may comprise any suitable component that is configured to communicate a message that is indicative of the mounting status of aftermarket device 10. In some examples, communication component 18 may be configured to communicate with an operator and/or occupant of the vehicle in which aftermarket device 10 is mounted. In such examples, communication component 18 may comprise a speaker that is configured to emit an audible signal and/or a display device (e.g., an illumination element, a display screen) that is configured to display a visible signal (e.g., a beam of light, a graphic image or textual message). In other examples, communication component 18 may be configured to communicate with a receiver located remotely from the vehicle. In such examples, communication component 18 may comprise a cellular chip set that is configured to initiate cellular telephone calls or an RF transmitter that is configured to transmit radio frequency signals.

Collision sensor 20 may comprise any suitable device configured to detect the occurrence of a vehicle collision. Such sensors are well known in the art. An exemplary collision sensor is manufactured by ST Microelectronics under the model number LIS3DH. In some examples, collision sensor 20 may operate most effectively when it is disposed in a known orientation. Deviations from that known orientation may have an adverse impact on the ability of collision sensor 20 to detect the occurrence of a collision. For this reason, as well as others, it may be desirable to provide a vehicle operator/owner with an alert when housing 12 becomes dislodged from an intended mounting position because such deviation from the proper mounting position will impact the orientation of collision sensor 20.

Figure 2:
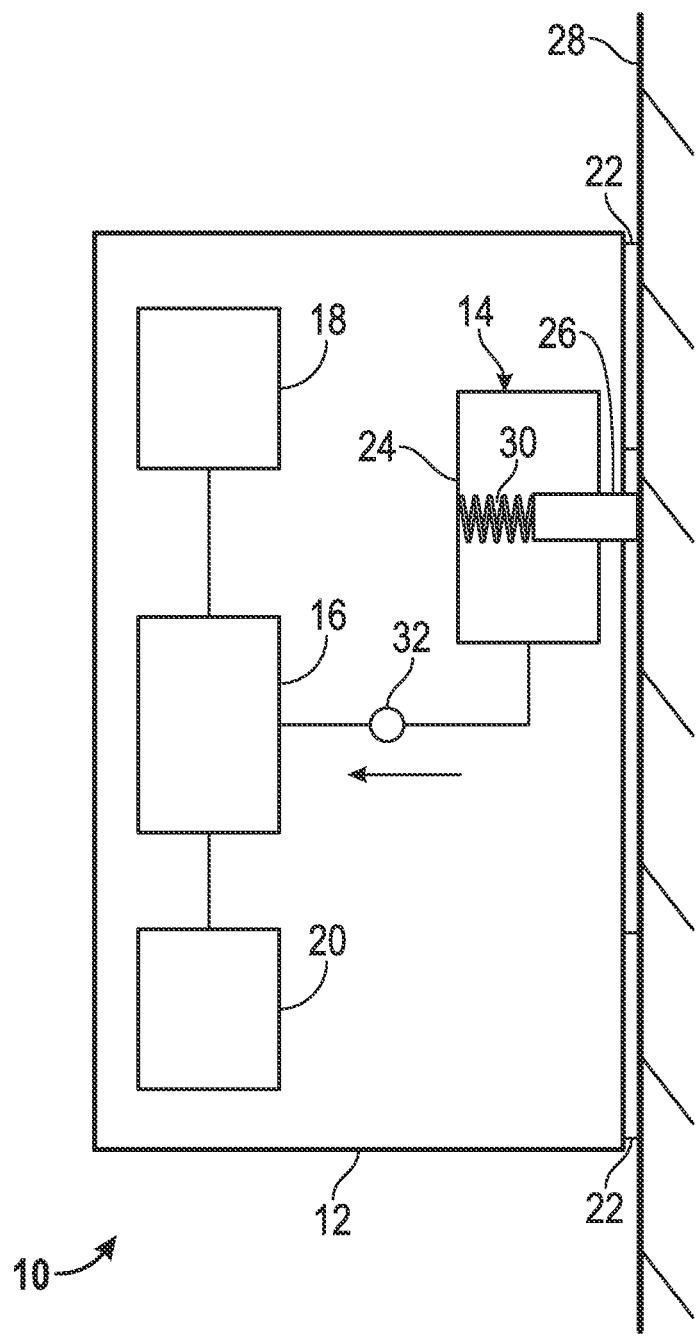
FIG. 2 is a schematic view illustrating the aftermarket device of FIG. 1 while it is properly mounted to an interior surface of a vehicle.

FIG. 2 is a schematic view illustrating aftermarket device 10 while it is properly mounted to internal surface 28. As illustrated, double sided adhesive 22 is adhered to internal surface 28. In other embodiments, aftermarket device 10 may be coupled to internal surface 28 by any other suitable means. When properly mounted to internal surface 28, member 26 is pressed into the retracted position (as illustrated in FIG. 2) by internal surface 28 and is obstructed by internal surface 28 from returning to the extended position. So long as aftermarket device 10 remains properly mounted to internal surface 28, member 26 will remain in the retracted position.

Aftermarket device 10 may be configured to determine the existence of an improper mounting situation in various ways. In the example illustrated in FIG. 2, mounting sensor 14 is configured to send a signal 32 to processor 16 when member 26 is disposed in the retracted position. If aftermarket device 10 were to become dislodged from internal surface 28, spring 30 would move member 26 out of the retracted position towards the extended position. When this occurs, mounting sensor 14 would cease sending signal 32 to processor 16. Processor 16 is configured to interpret the cessation of signal 32 as indicative of an improper mounting situation (e.g., aftermarket device 10 being partially or entirely dislodged from internal surface 28).

Figure 3:
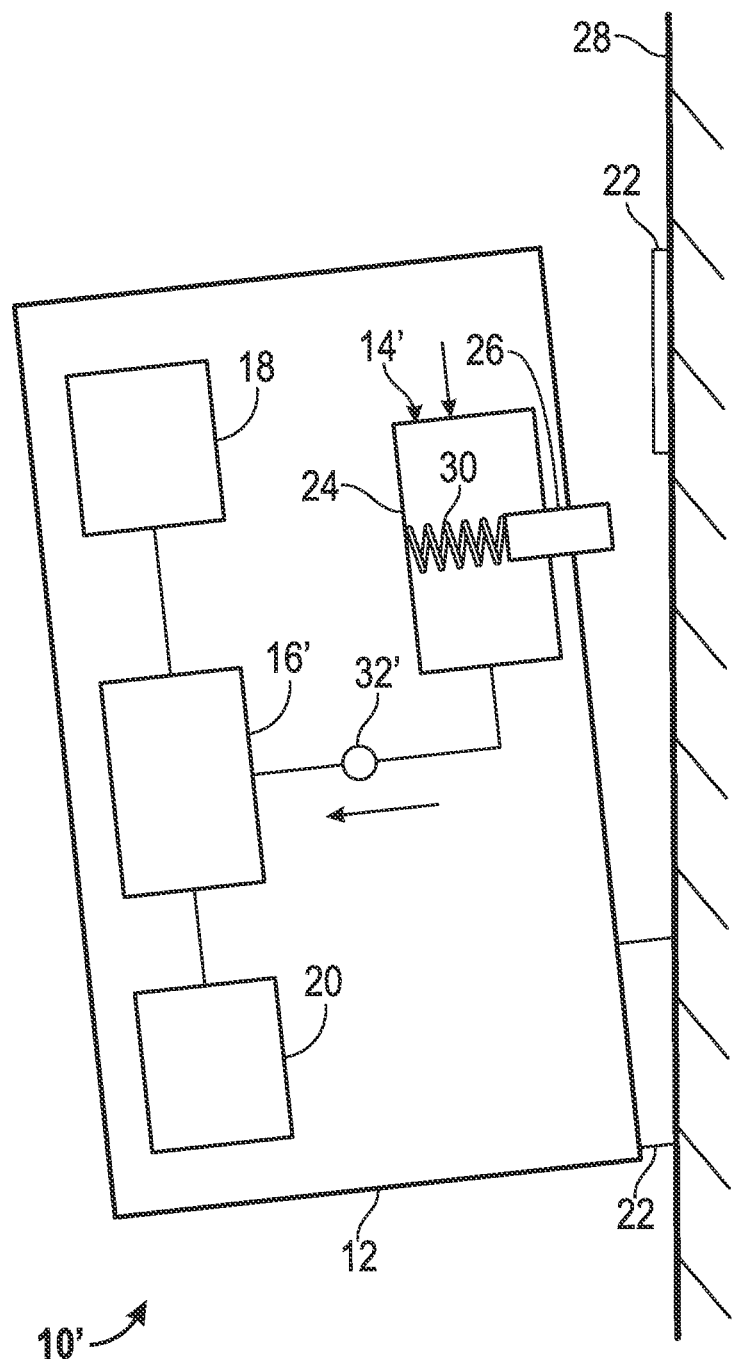
FIG. 3 is a schematic view illustrating the aftermarket device of FIG. 2 while it is improperly mounted to the interior surface of the vehicle.

An alternate example is illustrated in FIG. 3. In FIG. 3, the upper double sided adhesive 22 has become detached from housing 12, causing housing 12 to lean away from internal surface 28. The movement of housing 12 away from internal surface 28 permits spring 30 to move member 26 from the retracted position to the extended position. With continuing reference to FIG. 2, as compared with mounting sensor 14 that was configured to continuously transmit signal 32 to processor 16 while member 26 was in the retracted position, mounting sensor 14' is configured to transmit a signal 32' to processor 16' only when member 26 has moved away from the retracted position. Unlike processor 16 which interpreted the cessation of signal 32 as being indicative of an improper mounting situation, processor 16' is configured to interpret the receipt of signal 32' as being indicative of an improper mounting situation.

In other embodiments, rather than employing an on-off protocol for transmission of a signal (32, 32') to the processor (16, 16'), the mounting sensor (14, 14') may be configured to send a signal to the processor (16, 16') that is indicative of the precise location of member 26 with respect to housing 24. In such examples, the processor may be configured to use the precise location of member 26 to assess when housing 12 has become dislodged or has otherwise become improperly mounted to internal surface 28. Other protocols are also possible for determining when the aftermarket device (10, 10') is improperly mounted to internal surface 28.

With continuing reference to FIGS. 2 and 3, once the processor (16, 16') determines the existence of an improper mounting situation, the processor (16, 16') are configured to control communication component 18 to deliver a warning. In some examples, the warning may be delivered directly to an operator or an occupant of the vehicle. For example, communication component 18 may comprise a speaker that is configured to emit an audible alarm. In other examples, communication component 18 may comprise a light source that is configured emit an illumination. In other examples, communication component 18 may comprise a display screen that is configured to present graphic images, text-based messages, or both. In still other examples, communication component 18 may be configured to provide combinations of the audible and visual warnings just discussed.

In other examples, the warning may be delivered to a remote third party, such as a call center that is associated with a telematics service subscribed to by the vehicle owner or a vendor of the aftermarket device or to the vehicle owner via means other than in-vehicle alerts. In such examples, communication component 18 may comprise an RF transmitter or a cellular chip set or any other device suitable for transmitting wireless signals to remotely located parties. In the case of a call center, the transmission may comprise a data transmission that is routed by the call center to a live advisor who may then initiate voice communication with the operator/occupant of the vehicle to alert him or her as to the mounting condition of the aftermarket device (e.g., an aftermarket telematics unit). In other examples, the transmission may comprise an email or a text message delivered to an email account or cellular telephone associated with the vehicle owner.

In still other examples, aftermarket device 10 and aftermarket device 10' may be equipped with multiple communication components 18. In such examples, multiple warnings could be delivered to multiple parties including, but not limited to, a vehicle operator, a vehicle occupant, the vehicle owner, and/or a third party such as a telematics service system call center or a call center affiliated with the aftermarket device vendor.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An aftermarket device comprising:
a housing configured to be mounted to an internal surface of a vehicle;
a processor mounted within the housing;
a mounting sensor associated with the housing and communicatively coupled with the processor, the mounting sensor configured to detect a mounting status of the housing and to provide a signal to the processor, the signal containing information indicative of the mounting status of the housing; and
a biasing member,
wherein the mounting sensor comprises a sensing member configured to move between a first position and a second position, wherein the sensing member is disposed in the second position when the housing is properly mounted to the internal surface of the vehicle, wherein the sensing member is disposed in a position other than the second position when the housing is improperly mounted to the internal surface of the vehicle, wherein the sensing member is configured to be moved to the second position by the internal surface of the vehicle when the housing is properly mounted to the internal surface of the vehicle, wherein the biasing member is associated with the sensing member, wherein the biasing member biases the sensing member towards the first position, and wherein the processor is configured to determine that the housing is improperly mounted to the internal surface of the vehicle based on the mounting status.

2. The aftermarket device of claim 1, wherein the signal contains information indicative of the housing being incorrectly mounted to the internal surface of the vehicle.

3. The aftermarket device of claim 1, wherein the signal contains information indicative of the housing being correctly mounted to the internal surface of the vehicle.

4. The aftermarket device of claim 1, wherein the sensing member protrudes from the housing when the sensing member is in the first position and wherein the sensing member is retracted within the housing when the sensing member is in the second position.

5. The aftermarket device of claim 1, further comprising a communication component operatively coupled with the processor, wherein the processor is further configured to control the communication component to send a second signal indicative of the housing being improperly mounted to the internal surface of the vehicle when the processor determines that the housing is improperly mounted to the internal surface of the vehicle.

6. The aftermarket device of claim 5, wherein the communication component comprises a wireless transmitter configured to wirelessly transmit the second signal to a remote receiver.

7. The mounting sensor of claim 5, wherein the communication component comprises an emitter configured to emit an audible tone to an occupant of the vehicle.

8. The mounting sensor of claim 5, wherein the communication component comprises a display configured to display a visible indication to an occupant of the vehicle.

9. An aftermarket device comprising:
a housing configured to be mounted to an internal surface of a vehicle;
a processor mounted within the housing;
a mounting sensor associated with the housing and communicatively coupled with the processor, the mounting sensor configured to detect a mounting status of the housing and to provide a signal to the processor, the signal containing information indicative of the mounting status of the housing;
a biasing member; and
a collision sensor communicatively coupled with the processor, the collision sensor configured to detect when the vehicle has experienced a collision and to provide a second signal to the processor, the second signal containing information indicative of an occurrence of the collision,
wherein the mounting sensor comprises a sensing member configured to move between a first position and a second position, wherein the sensing member is disposed in the second position when the housing is properly mounted to the internal surface of the vehicle, wherein the sensing member is disposed in a position other than the second position when the housing is improperly mounted to the internal surface of the vehicle, wherein the sensing member is configured to be moved to the second position by the internal surface of the vehicle when the housing is properly mounted to the internal surface of the vehicle, wherein the biasing member is associated with the sensing member, wherein the biasing member biases the sensing member towards the first position, and wherein the processor is configured to determine that the housing is improperly mounted to the internal surface of the vehicle based on the mounting status.

10. The aftermarket device of claim 9, wherein the signal contains information indicative of the housing being incorrectly mounted to the internal surface of the vehicle.

11. The aftermarket device of claim 9, wherein the signal contains information indicative of the housing being correctly mounted to the internal surface of the vehicle.

12. The aftermarket device of claim 9, wherein the sensing member protrudes from the housing when the sensing member is in the first position and wherein the sensing member is retracted within the housing when the sensing member is in the second position.

13. The aftermarket device of claim 9, further comprising a communication component operatively coupled with the processor, wherein the processor is further configured to control the communication component to send a third signal indicative of the housing being improperly mounted to the internal surface of the vehicle when the processor determines that the housing is improperly mounted to the internal surface of the vehicle.

14. The mounting sensor of claim 13, wherein the communication component comprises a wireless transmitter configured to wirelessly transmit the third signal to a remote receiver.

15. The mounting sensor of claim 13, wherein the communication component comprises one of an emitter and a display, the emitter configured to emit an audible tone to an occupant of the vehicle and the display configured to display a visible indication to the occupant of the vehicle.

16. An aftermarket device comprising:
a housing configured to be mounted to an internal surface of a vehicle;
a processor mounted within the housing; and
a mounting sensor associated with the housing and communicatively coupled with the processor, the mounting sensor configured to detect a mounting status of the housing and to provide a signal to the processor, the signal containing information indicative of the mounting status of the housing,
wherein the mounting sensor comprises a sensing member configured to move between a first position and a second position, wherein the sensing member is disposed in the second position when the housing is properly mounted to the internal surface of the vehicle, wherein the sensing member is disposed in a position other than the second position when the housing is improperly mounted to the internal surface of the vehicle, and wherein the sensing member is configured to be moved to the second position by the internal surface of the vehicle when the housing is properly mounted to the internal surface of the vehicle, wherein the sensing member protrudes from the housing when the sensing member is in the first position and wherein the sensing member is retracted within the housing when the sensing member is in the second position, and wherein the processor is configured to determine that the housing is improperly mounted to the internal surface of the vehicle based on the mounting status.

* * * * *